(12) United States Patent
Wang et al.

(10) Patent No.: US 9,195,582 B2
(45) Date of Patent: Nov. 24, 2015

(54) DATA STORING METHOD AND APPARATUS APPLIED TO FLASH MEMORY STORAGE DEVICE

(75) Inventors: Rui-qing Wang, Shenzhen (CN); Da-teng Li, Shenzhen (CN); Wei Wu, Shenzhen (CN)

(73) Assignee: MStar Semiconductor, Inc., Hsinchu Hsien (TW)

( * ) Notice: Subject to any disclaimer, the term of this patent is extended or adjusted under 35 U.S.C. 154(b) by 567 days.

(21) Appl. No.: 13/542,993

(22) Filed: Jul. 6, 2012

(65) Prior Publication Data

US 2013/0019056 A1    Jan. 17, 2013

(30) Foreign Application Priority Data

Jul. 12, 2011    (CN) .......................... 2011 1 0194055

(51) Int. Cl.
  *G06F 12/00*    (2006.01)
  *G06F 12/02*    (2006.01)
  *G06F 12/10*    (2006.01)

(52) U.S. Cl.
  CPC ............ *G06F 12/0246* (2013.01); *G06F 12/10* (2013.01); *G06F 2212/1036* (2013.01); *G06F 2212/7202* (2013.01)

(58) Field of Classification Search
  CPC ............................ G06F 12/0246; G06F 12/10
  USPC .......................................................... 711/103
  See application file for complete search history.

(56) References Cited

U.S. PATENT DOCUMENTS

| 8,065,497 | B2 * | 11/2011 | Chu et al. ...................... 711/160 |
| 8,275,928 | B2 * | 9/2012 | Lin ................................ 711/103 |
| 2008/0276036 | A1 * | 11/2008 | Van Acht et al. ............. 711/103 |
| 2010/0115186 | A1 * | 5/2010 | Chang et al. .................. 711/103 |

FOREIGN PATENT DOCUMENTS

| CN | 101923516 A | 12/2010 |
| TW | 201118570 A | 6/2011 |

* cited by examiner

*Primary Examiner* — Prasith Thammavong
(74) *Attorney, Agent, or Firm* — Edell, Shapiro & Finnan, LLC

(57) ABSTRACT

A data storage method applied to a flash memory storage device is provided. The method includes: identifying a first tag pointing to a storage unit storing a first data, the first data being a newly updated data; locating the storage unit storing the first data according to the first tag; storing a second data to another storage unit; pointing the first tag to the another storage unit storing the second data. A relationship between the first tag and the storage unit storing the first data is first built. The second data is stored to another storage unit different from the storage unit pointed by the first tag, and a relationship between the first tag and the another storage unit storage the second data is rebuilt. Therefore, data is efficiently stored by using a plurality of storage units to prolong a lifespan of the flash memory.

12 Claims, 8 Drawing Sheets

DATA STORING METHOD AND APPARATUS APPLIED TO FLASH MEMORY STORAGE DEVICE

This application claims the benefit of People's Republic of China application Serial No. 201110194055.7, filed Jul. 12, 2011, the subject matter of which is incorporated herein by reference.

BACKGROUND OF THE INVENTION

1. Field of the Invention

The invention relates in general to a data storage technique, and more particularly to a data storing method and apparatus applied to a flash memory storage device.

2. Description of the Related Art

Current electronic products are basically equipped with a storage device. Common storage devices include a flash memory and an electrically erasable programmable read-only memory (EEPROM), both of which have their pros and cons.

A flash memory is greatly advantaged by having a large capacity and a low cost. However, it suffers from disadvantages of providing a slow erasing and writing speed. In each erasing and writing process, erasing is first performed before the flash memory can be written to, and a smallest unit is one bank comprising 64 KB. In addition, each storage unit is only readable/writeable for a around a barely satisfactory number of 100 thousand times.

An EEPROM is compromised by a drawback of having a small capacity and a high cost. Yet, it contributes advantages of having a fast erasing and writing speed. Each erasing and writing process can be performed in a unit of one byte, and each unit is readable/writable up to a million times.

At least two types of data needs to be stored when a data storage device stores data—program data and user data. When a storage device is shipped out of the factory, the program data usually stays unchanged unless a software upgrade is needed. Therefore, a flash memory is commonly used as a storage device for program data. In contrast, since user data is frequently modified, a corresponding storage device needs to meet higher requirements of readable/writable number of times and stability.

Again, following issues arise when a flash memory is adopted for storing user data based on cost concerns. As previous stated, a flash memory has a slow erasing and writing speed, and a minimum unit for erasing and writing of most Serial Peripheral Interface (SPI) flash memories is a bank comprising 64 KB that takes more than 100 ms for each erasing process. Further, excessive erasing processes not only inevitably have undesirable effects on a lifespan of a flash memory but also slow down a speed of data storing.

SUMMARY OF THE INVENTION

The invention is directed to a data storing method and apparatus applied to a flash memory storage device to prolong a lifespan of the flash memory storage device and quickly complete data storing.

According to an aspect the present invention, a data storing method applied to a flash memory storage device comprising a plurality of storage units is provided. The method comprises: identifying a first tag, the first tag pointing to a storage unit storing a first data, the first data being a newly updated data; locating the storage unit storing the first data according to the first tag; storing a second data to another storage unit; and pointing the first tag to the another storage unit storing the second data.

The method further comprises: rendering a second tag pointing to all other storage units apart from the another storage unit storing the second data.

The step of pointing the first tag to the another storage unit storing the second data comprises: modifying a storage position of the first tag such that the modified first tag points to a position of the another storage unit storing the second data.

A number of the storage units of the flash memory storage device is a first number, and each storage unit comprises a second number of bytes. The second number is greater than the first number. In the first number of storage units, a first storage unit comprises the first number of bytes for respectively storing the first tag and the second tag. Relative positions of the first number of bytes for storing the first tag and the second tag in the first storage unit respectively correspond to relative positions of the first number of storage units. Wherein, a byte of the storage unit storing the first data stores the first tag while all remaining bytes store other second tags, and a content of the byte corresponding to the first tag is different from a content of the bytes corresponding to the second tag. The step of identifying the first tag and locating the storage unit storing the first data according to the first tag comprises: checking one after another from a first byte of the first storage unit; upon identifying the byte storing the first tag, confirming a relative position of the identified tag among the first number of consecutive bytes of the first storage unit; and confirming the relative position of the identified byte corresponding to the storage unit of the first number of storage units is the storage unit storing the first data.

The first number is 32, and the second number is 2k. The flash memory storage device comprises a plurality of storage regions each comprising 32 storage units. First 32 bytes of the first storage unit in each storage region store the first tag and the second tag.

The first number is 64, and the second number is 2k. First 32 bytes of the first storage unit in each storage region stores the first tag and the second tag.

The step of storing the second data to the another storage unit comprises: storing the second data to the another storage unit in another storage region different from the storage region storing the first data. The step of pointing the first tag to the another storage unit storing the second data comprises: confirming a relative position of the another storage unit storing the second data in another storage region, locating a byte of a first storage unit of another storage region corresponding to the relative position of the another unit storing the second data, and storing the first tag to the located byte, such that the first tag points to the another storage unit storing the second data. The step of rendering the second tag pointing to all the remaining storage units apart from the another storage storing the second data comprises changing the byte of the first storage unit of the storage region storing the first data to store the second tag from the first tag.

Before storing the second data to the another storage unit of the another storage region different from the storage region storing the first data, it is determined whether a free storage unit in the another storage region apart from the storage region comprising the storage unit pointed to by the first tag is available. When it is determined that the free storage unit in the another storage region is unavailable, the second data is stored to a free storage unit of the another storage region of the flash memory storage device. A relative position of the another storage unit in the another storage region storing the second data is confirmed, a byte of a first storage unit of another storage region corresponding to a relative position of the another storage unit storing the second data is located, and the first tag is stored to the located byte, such that the first tag points to the another storage unit storing the second data. The byte of the first storage unit of the storage region storing the first data is changed to store the second tag from the first tag. The another storage region is erased after storing the second data.

When a third data needs to be stored after erasing the another storage region, the method further comprises storing the third data to a free storage unit of the another storage region; confirming a relative position of the storage unit storing the third data, locating a byte of a first storage unit of the another storage region corresponding to the relative position of the storage unit storing the third data, and storing the first tag to the located byte such that the first tag points to the storage unit storing the third data; and changing the byte of the first storage unit of the storage region storing the first data to store the second tag from the first tag.

According to another aspect of the present invention, a data storing apparatus applied to a flash memory storage device comprising a plurality of storage units is provided. The apparatus comprises: a tag identifying module, for identifying a first tag, the first tag pointing to a storage unit storing a first data, the first data being a newly updated data; a data locating module, for locating the storage unit storing the first data according to the first tag; a data storage module, for storing a second data to another storage unit; and a tag processing module, for rendering the first tag pointing to the another storage unit storing the second data.

The tag processing module further renders a second tag pointing to all remaining storage units apart from the another storage unit storing the second data.

The tag processing module further modifies a storage position of the first tag, such that the storage position of the first tag points to the another storage unit storing the second data.

A number of the storage units of the flash memory storage device is a first number, each storage unit comprises a second number of bytes, a first storage unit in the first number of storage units comprises the first number of bytes for respectively storing the first tag and the second tag, and the second number is greater than the first number. Relative positions of the first number of bytes for storing the first tag and the second tag in the first storage unit respectively correspond to relative positions of the first number of storage units. A byte of the storage unit storing the first data stores the first tag while all remaining bytes store other second tags, and a content of the byte corresponding to the first tag is different from a content of the bytes corresponding to the second tag. The tag identifying module further checks one after another from a first byte of the first storage unit, and confirms a relative position of the identified tag among the first number of consecutive bytes of the first storage unit upon identifying the byte storing the first tag. The data locating module confirms that the relative position of the identified byte corresponding to the storage unit of the first number of storage units is the storage unit storing the first data.

The first number is 32 and the second number is 2k. The flash memory storage device comprises a plurality of storage regions each comprising 32 storage units, and first 32 bytes of a first storage unit of each storage region are for storing the first tag and the second tag.

The first number is 64 and the second number is 2k, and first 64 bytes of the first storage unit of the plurality of storage units are for storing the first tag and the second tag.

The data storage module further stores the second data to another storage unit of another storage region different from the storage region storing the first data. The tag processing module further confirms a relative position of the another storage unit storing the second data in the another storage region, locates a byte of a first storage unit of another storage region corresponding to a relative position of the another storage unit storing the second data and stores the first tag to the located byte, such that the first tag points to the another storage unit storing the second data, and changes the byte of the first storage unit of the storage region storing the first data to store the second tag from the first tag.

The apparatus further comprises a determining module and an erasing module. When the data storage module stores the second data to the another storage unit of the another storage region different from the storage region storing the first data, the determining module determines whether a free storage unit in the another storage region apart from the storage region comprising the storage unit pointed to by the first tag is available. When the determining module determines that the free storage unit is unavailable in the another storage region, the data storing module stores the second data to a free storage unit in another storage region of the flash memory storage device. The tag processing module confirms a relative position of another storage unit storing the second data in another storage region, locates a byte of a first storage unit of another storage region corresponding to a relative position of the another storage unit storing the second data and stores the first tag to the located byte such that the first tag points to the another storage unit storing the second data, and changes the byte of the first storage unit of the storage region storing the first data to store the second tag from the first tag. The erasing module erases the another storage region after the data storage module stores the second data.

When a third data needs to be stored after the erasing module erases the another storage region, the data storing module stores the third data to a free storage unit in another storage region. The tag processing module confirms a relative position of the storage unit storing the third data, locates a byte of a first storage unit of another storage region corresponding to a relative position of the another storage unit storing the third data and stores the first tag to the located byte such that the first tag points to the another storage unit storing the third data, and changes the byte of the first storage unit of the storage region storing the first data to store the second tag from the first tag.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
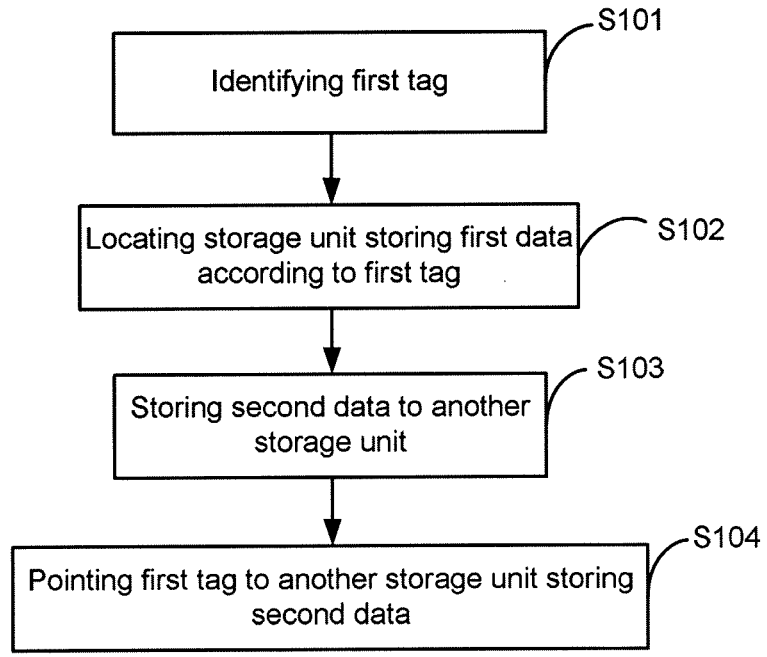
FIG. 1 is a flowchart of a data storing method applied to a flash memory storage device according to an embodiment of the present invention.

FIG. 1 shows a flowchart of a data storing method applied to a flash memory storage device according to an embodiment of the present invention. In this embodiment, the flash memory storage device comprises a plurality of storage units.

Step S101 comprises identifying a first tag. The first tag points to a position of a storage unit storing a first data, which is a newly updated data.

Step S102 comprises locating the storage unit storing the first data according to the first tag.

Step S103 comprises storing a second data to another storage unit.

Step S104 comprises pointing the first tag to the another storage unit storing the second data.

It is apparent in this embodiment that, a current storage unit storing user data each time is different from a previous storage unit storing user data, such that data storage is effectively carried out by utilizing a plurality of storage units in turn. It should be noted that modifications can be made as long as user data is stored in different storage units of different storage regions, as the modifications made are also encompassed within the scope of the present invention.

Figure 2:
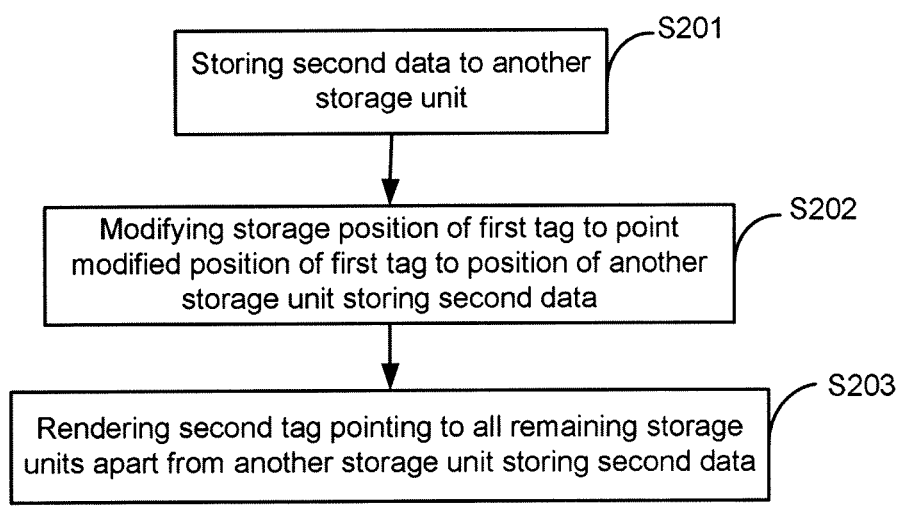
FIG. 2 is a flowchart of a data storing method applied to a flash memory storage device according to another embodiment of the present invention.

FIG. 2 shows a flowchart of a data storing method according to another embodiment of the present invention.

Step S201 comprises storing a second data to another storage unit.

Step S202 comprises modifying a storage position of the first tag to point the modified position of the first tag to a position of the another storage unit storing the second data.

Step S203 comprises rendering a second tag and pointing the second tag to all remaining storage units apart from the another storage unit storing the second data.

In this embodiment, by using different first tag and second tag, the first tag points the another storage unit storing the second data, and the second tag points to the storage units not storing newly updated data. Thus, by identifying the first tag to locate the storage unit storing the newly updated data, the storage units not storing data can be utilized for a next storing process to effectively and quickly complete data storage.

Figure 3:
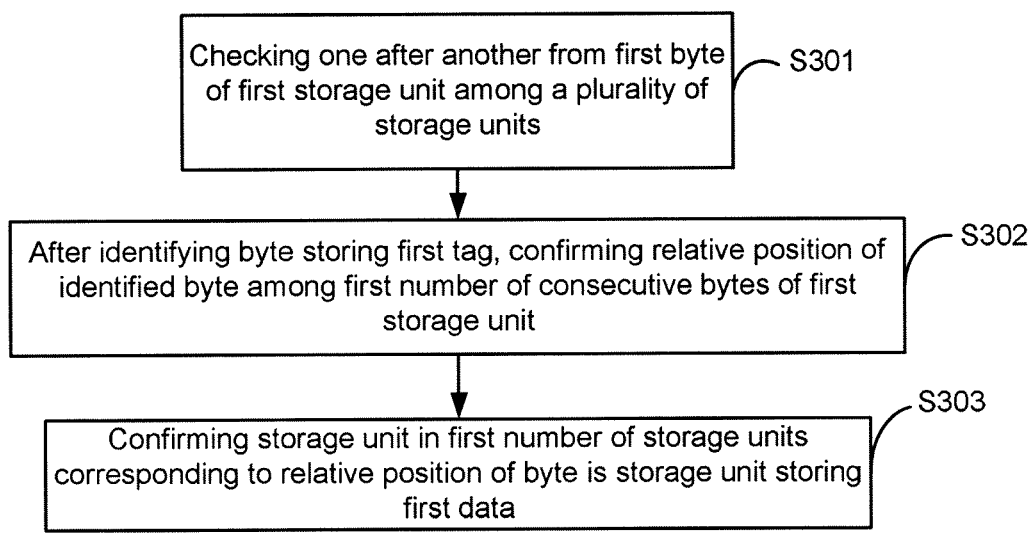
FIG. 3 is a flowchart of a data storing method applied to a flash memory storage device according to yet another embodiment of the present invention.

FIG. 3 shows a flowchart of a data storing method according to yet another embodiment of the present invention. With the data storing method according to this invention, a first tag is identified and a storage unit storing a first data is located according to the first tag.

Step S301 comprises checking one after another from a first byte of a first storage unit among a plurality of storage units.

Step S302 comprises, after identifying the byte storing the first tag, confirming a relative position of the identified byte among a first number of consecutive bytes of the first storage unit.

Step S303 comprises confirming a storage unit in a first number of storage units corresponding to the relative position of the byte is the storage unit storing the first data.

In this embodiment, by orderly checking the bytes of the first storage unit one after another until the byte corresponding to the first tag is identified, the storage unit storing the first data is accurately located according to the first tag to facilitate a next step for data storage.

In this embodiment, a number of the storage units of the flash memory storage device is the first number, each storage unit comprises a second number of bytes, and the first storage unit of the first number of storage units comprises the first number of bytes for respectively storing the first tag and the second tag, where the second number is greater than the first number. In the first storage unit, relative positions of the first number of bytes for respectively storing the first tag and the second tag respectively correspond to relative positions of first number of storage units. A byte of the storage unit storing the first data is for storing the first tag while all other remaining bytes are for storing another second tag, and a content of the byte corresponding to the first tag differs from a content of the bytes corresponding to the second tag. Preferably, the first number is 32 and the second number is 2k. The flash memory storage device comprises a plurality of storage regions each comprising 32 storage units, and first 32 bytes of a first storage unit of each storage region are for storing the first tag and the second tag.

Preferably, the first number is 64 and the second number is 2k. First 64 bytes of the first storage unit of the plurality of storage units are for storing the first tag and the second tag.

Figure 4:
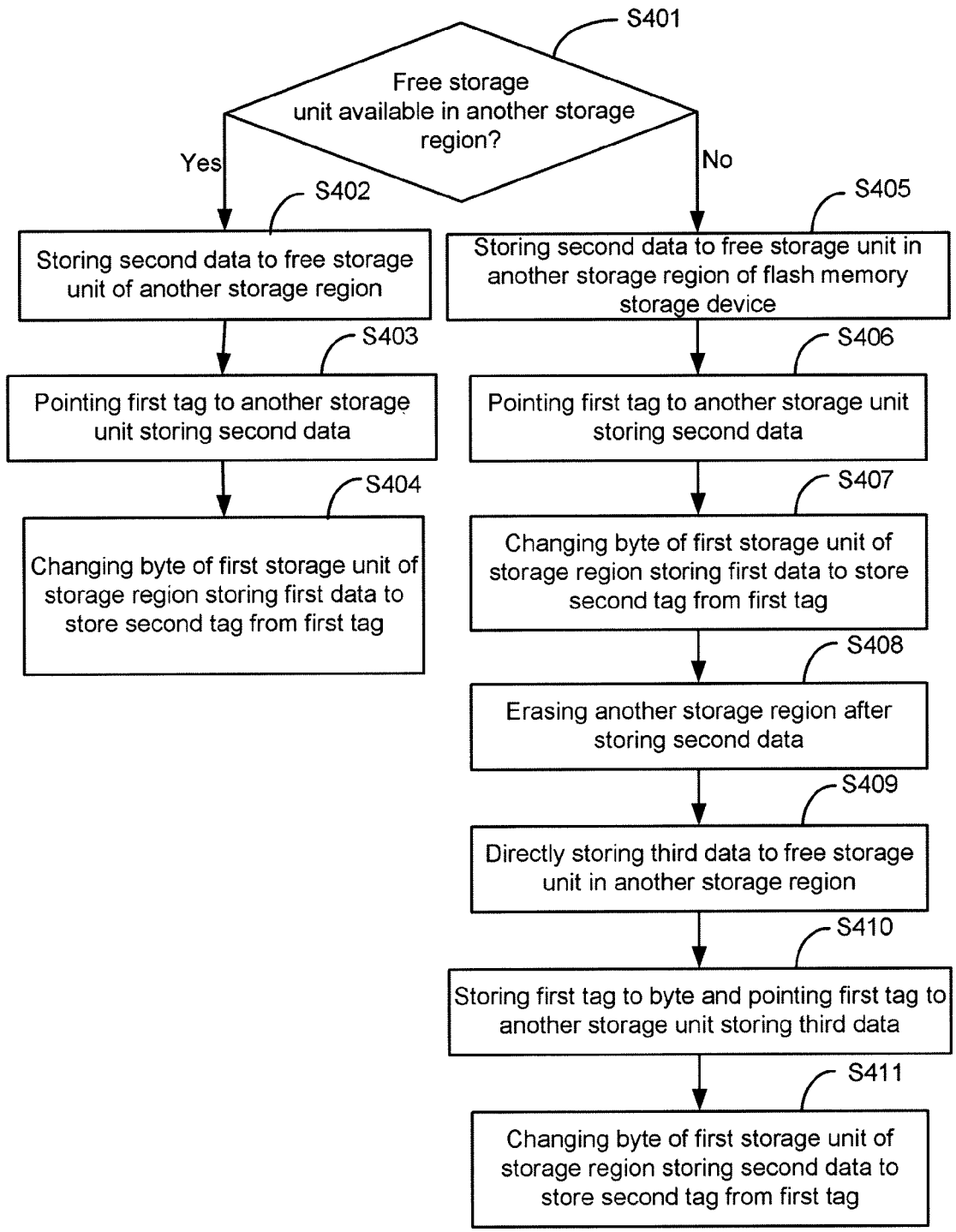
FIG. 4 is a flowchart of a data storing method applied to a flash memory storage device according to yet another embodiment of the present invention.

FIG. 4 shows a flowchart of a data storing method according to yet another embodiment of the present invention.

Step S401 comprises, before storing a second data to another storage unit of another storage region different from a storage region storing a first data, determining whether a free storage unit in the another storage region apart from the storage region comprising the storage unit pointed to by the first tag is available.

When it is determined that a free storage unit in the another storage region is unavailable, Step S402 is performed. Step S402 comprises storing the second data to a free storage unit of the another storage region. Step S403 comprises confirming a relative position of the another storage unit in the another storage region storing the second data, locating a byte of a first storage unit of another storage region corresponding to a relative position of the another storage unit storing the second data, and storing the first tag to the located byte such that the first tag points to the another storage unit storing the second data. Step S404 comprises changing the byte of the first storage unit of the storage region storing the first data to store the second tag from the first tag. Supposing a third tag needs to be stored at this point, Step S401 is iterated to determine whether a free storage unit in available in the another storage region apart from the storage region comprising the storage region pointed to by the first tag. That is to say, it is determined whether a free storage unit is available in another storage region apart from the storage region storing the second data. A following step is same as stated above and shall not be further described.

When it is determined that a free storage unit is unavailable in another storage region, Step S405 is performed. Step S405 comprises storing the second data to another free storage unit in another storage region of the flash memory storage device. Steps S406 and S407 same as Steps S403 and S404 are performed to point the first tag to the storage unit storing the second data and point the second tag to all remaining storage units apart from the storage unit storing the second data. Step S408 comprises erasing the another storage region after storing the second data. When a third data needs to be stored after erasing the another storage region, Step S409 comprises directly storing the third data to a free storage unit of the another storage region since free storage units are available in the erased another storage region. Step S410 comprises confirming a relative position of the storage unit storing the third data, locating a byte of a first storage unit of the another storage region corresponding to the relative position of the storage unit storing the third data, and storing the first tag to the located byte such that the first tag points to the storage unit storing the third data. Step S411 comprises changing the byte of the first storage unit of the storage region storing the second data to store the second tag from the first tag.

It is illustrated in the above steps that, when a free storage unit is unavailable in a currently used storage region, i.e., a currently used storage region is full with data, and new data is stored to another storage region, so that data lost is prevented even in the event of abnormalities such as a sudden power off.

Figure 5:
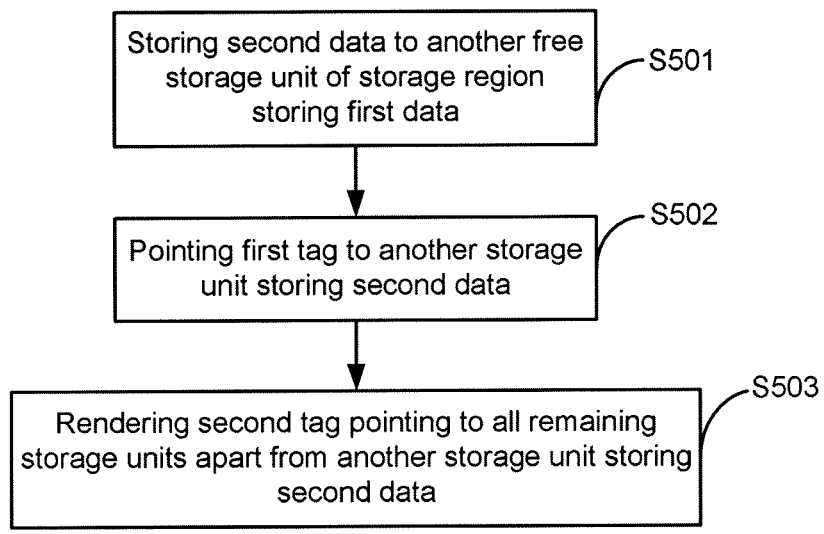
FIG. 5 is a flowchart of a data storing method applied to a flash memory storage device according to yet another embodiment of the present invention.

FIG. 5 shows a flowchart of a data storing method according to yet another embodiment of the present invention.

Step S501 comprises storing a second data to another free storage unit of a storage region storing a first data.

Step S502 comprises pointing a first tag to the another storage unit storing the second data.

Step S503 comprises rendering a second tag and pointing the second tag to all remaining storage units apart from the another storage unit storing the second data.

For illustrative purposes, the storage unit storing the first data is referred to as a first storage region and the another storage region is referred to as a second storage region in the following description of this embodiment. Between the first storage region and the second storage region, the step of determining the storage unit storing the first tag comprises: respectively reading first 2k storage units of the first storage region and the second storage region. In first consecutive 32 bytes of the first 2k storage units, relative positions of the bytes respectively correspond to relative positions of the 32 2k storage units in the storage region. A first content of the byte is marked by the first tag, and all remaining bytes are marked by the second tag. A storage position of the first tag in the 32 consecutive bytes of the first 2k storage units corresponds to a position of the storage unit in the storage region storing the second data. Thus, when reading the byte of the first tag, it is confirmed that the storage region comprising the first tag is to a storage region corresponding to a newly updated data.

In this embodiment, when it is determined that the first storage region is not fully written, the second data may be stored to a free storage unit of the first storage region. Meanwhile, the first tag is stored to a byte at a corresponding position in the first storage unit of the first storage region, such that the first tag points to a position of the storage unit storing the second data and the first tag pointing to the second storage region is removed.

In this embodiment, regardless whether the first storage region is fully written, the second data may be stored to a free storage unit of the second storage region. Meanwhile, the first tag is stored to a byte at a corresponding position in the first storage unit of the second storage region, such that the first tag points to a position of the storage unit storing the second data and the first tag pointing to the first storage region is removed.

The embodiment shall be described with more details below.

Figure 6:
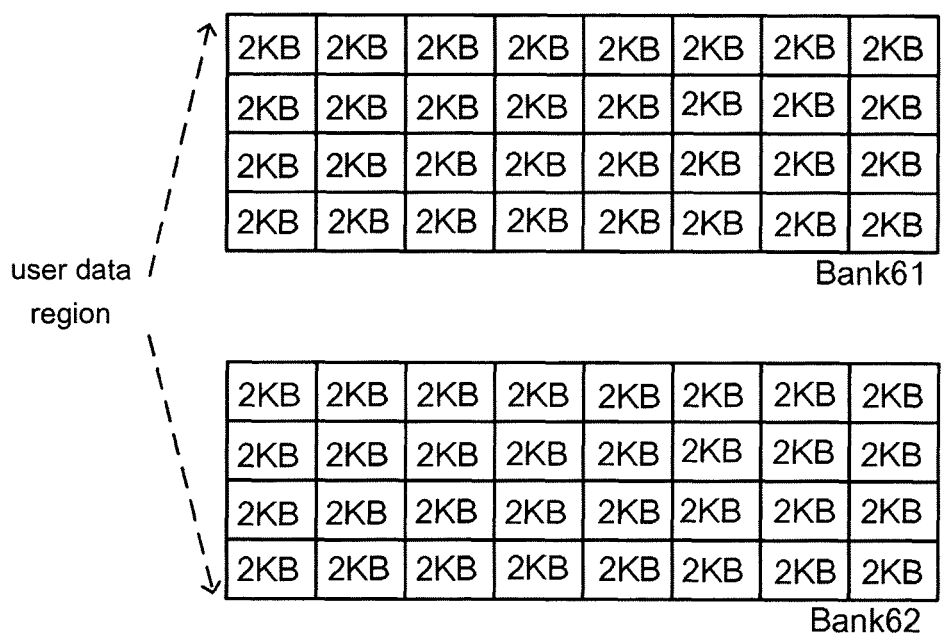
FIG. 6 is a schematic diagram of an internal being divided in a flash memory storage device according to an embodiment of the present invention.
Figure 7:
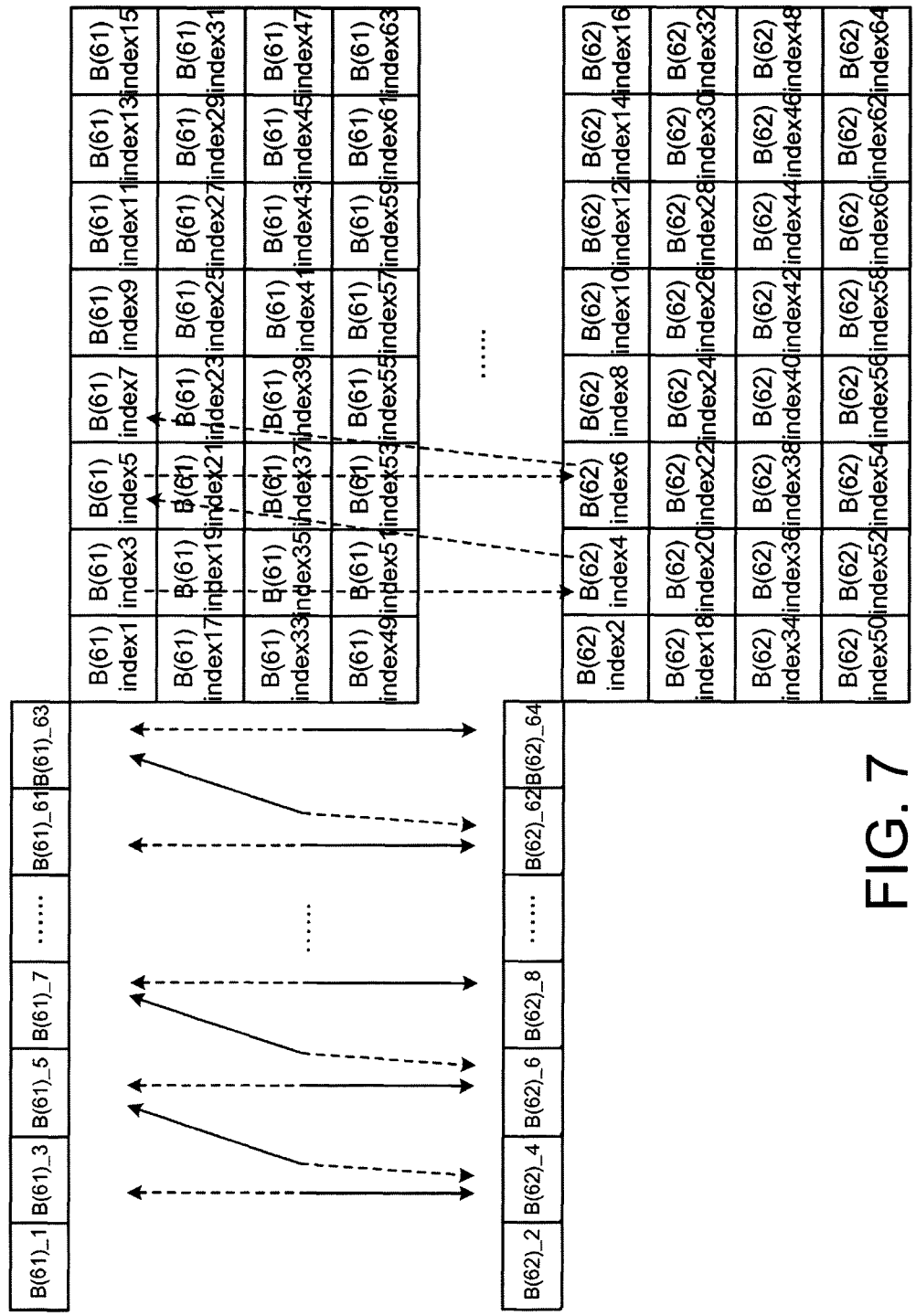
FIG. 7 is a schematic diagram of an internal being divided in a flash memory storage device according to an embodiment of the present invention.

In the flash memory storage device, a great majority of storage space stores program data and a remaining minority (around 5 banks) stores user data. A data amount of user data is usually within 2 KB. In this embodiment, a user data region divided into two storage regions Bank is taken as an example for illustration. The two storage regions Bank are tagged as, e.g., a first storage region Bank61 and a second storage region Bank62, each having a storage capacity of 64 KB. With reference to FIGS. 6 and 7, in this embodiment, the first storage region Bank61 and the second storage region Bank62 are divided into 64 storage units, such that each of the first storage region Bank61 and the second storage region Bank62 comprises 32 storage units each having a storage capacity of 2 KB.

When an end user watches a television program through a television comprising the above flash memory storage device, user data is sequentially stored to one of the first storage region Bank61 or the second storage region Bank62 in the event that the user data is adjusted.

The storage units in the storage regions in this embodiment are sequentially and orderly tagged according to tags of the storage regions. For example, the storage units in the first storage region Bank61 are respectively assigned with odd numbers as B(61)Index 1, 3, . . . , 63 (2n+1, n=0, . . . , 31); the storage units in the second storage region Bank62 are respectively assigned with even numbers as B(62)Index 2, 4, . . . , 64 (2m, m=1, . . . , 32).

First 32 bytes of a first storage unit of each storage region Bank are assigned with odd numbers as B(61)_1, 3, . . . , 63 (2n+1, n=0, . . . , 31); first 32 storage units in the second storage region Bank62 are assigned with even numbers as B(62)_2, 4, . . . , 64 (2m, m=1, . . . , 32).

In this embodiment, a system respectively reads the first storage unit of the first storage region Bank61 and the second storage region Bank62 during a boot-up process. In the consecutive 32 bytes of the first storage unit, relative positions of the bytes respectively correspond to relative positions of the 32 storage units in the storage regions.

In this embodiment, a newly updated data mark is indicated by a first tag of the byte, e.g., 0x3F, while all remaining bytes are indicated by a second tag, e.g., 0x1F. A position of the newly updated data mark indicated by the first tag 0x3F in the 32 bytes corresponds to a position of a storage unit storing a newly updated user data in the storage region. When the byte of the first tag 0x3F is read, it is confirmed that the storage region comprising the first tag 0x3F is the storage region corresponding to the newly updated data mark.

For example, suppose it is identified with a system scan that a value stored in a second byte B(61)_3 of the first storage unit of the first storage region Bank61 is the first tag 0x3F while other values are the second tag 0x1F. According to such result, the system reads a last saved user data (i.e., a newly updated data) before a system shut-down from the second storage unit B(61)Index3 corresponding to the second byte B(61)_3 from the first storage region Bank61. At this point, when a user data change is desired, e.g., adjusting a volume from 20 to 21, a next user data "volume 21" is stored according to the storage unit B(61)Index 3 storing the newly updated user data "volume 20", and the newly updated user data is updated to "volume 21". The system then correspondingly executes three steps below to be described with reference to FIG. 7. In FIG. 7, an arrow of each short dotted line represents storing to the second tag 0x1F, an arrow of each solid line connected with a dotted-line arrow represents storing to the first tag 0x3F, and an arrow of each long dotted line indicates how a user data is alternately stored to different storage regions.

c1) The newly updated user data is stored to the second storage unit B(62)Index4 of the second storage region Bank62.

c2) 0x1F is stored in the second byte B(61)_3 of the first storage unit of the first storage region Bank61 to replace the previous value 0x3F.

c3) 0x3F is stored in the second byte B(62)_4 of the first storage unit of the second storage region Bank62 to replace the previous value 0x1F.

With the steps above, the newly updated user data is stored to the storage unit B(62)Index4.

Similarly, to perform a next user data change, e.g., adjusting the volume from 21 to 22, the system correspondingly executes three steps below.

d1) The newly updated user data is stored to the third storage unit B(61)Index5 of the first storage region Bank61.

d2) 0x1F is stored in the second byte B(62)_4 of the first storage unit of the second storage region Bank62 to replace the previous value 0x3F.

d3) 0x3F is stored in the third byte B(61)_5 of the first storage unit of the first storage region Bank61 to replace the previous value 0x3F.

With the steps above, the newly updated user data is stored to the storage unit B(62)Index5.

It is apparent from the above description that, the present invention divides the first storage region Bank61 and the second storage bank Bank62 into 64 storage regions, among which the user data is stored in turn when storing the user data. For example, the first user data is stored in the storage unit B(61)Index3, the second user data is stored in the storage unit B(62)Index4, the third user data is stored in the storage unit B(61)Index5, . . . , so as to complete data storage by taking turns. Before the user data is again stored to a previously written storage unit, e.g., the user data is again stored to the storage unit B(61)Index3, 62 times of data writing are already performed. Therefore, a probability that a same storage unit is repeated written is significantly reduced to thereby prolong a lifespan of the flash memory storage device.

In this embodiment, when the first storage region Bank61 is fully stored with user data, the newly updated user data is stored in B(61)Index3. At this point, a next user data is stored to a last storage unit (B(62)Index64) of the second storage region Bank62, and the newly updated user data is stored in B(62)Index64 (to point the first tag 0x3F to B(62)Index64). According to the principle of storing in turns, the two storage regions at this point are fully stored with user data. Therefore, to further proceed with user data storage, the entire 64 KB of the first storage region Bank61 need to be erased. At this point, in the event of a sudden power-off, the first tag 0x3F stored in the byte B(62)_64 and the newly updated data stored in the storage unit B(62)Index64 are still kept in the second storage region Bank62. In a next power-on, the storage unit B(62)Index64 storing the user data is located according to the first tag 0x3F recorded in the byte B(62)_64 in the first storage unit of the second storage region Bank62. Therefore, during abnormalities such as a sudden power-off, the present invention is capable of protecting the user data intact.

In turn, when the newly updated user data is stored in the first storage unit B(61)Index3 of the erased first storage region Bank61, the entire 64 KB of the fully-written second storage region Bank62 needs to be erased when a next user data storing is desired. At this point, in the event of a sudden power-off, the first tag 0x3F stored in the byte B(61)_3 and the newly updated data stored in the storage unit B(61)Index3 are still kept in the second storage region Bank62. In a next power-on, the storage unit B(61)Index3 storing the user data and the newly updated user data stored therein is located according to the first tag 0x3F recorded in the byte B(61)_3 in the first storage unit of the first storage region Bank61. Therefore, during abnormalities such as a sudden power-off, the present invention is capable of protecting the user data intact.

In this embodiment, only one byte of the first storage units of the first storage region Bank61 and the second storage region Bank62 at any random moment store the value 0x3F while all remaining 61 bytes store the value 0x1F. Therefore, the system locates the value 0x3F when powering on, reads the newly updated user data from the corresponding storage unit, and performs a next user data storing according to the stored location of the newly updated user data.

In this embodiment, in each turn, a current storage unit storing the user data is different from the previous storage unit storing the user data. It should be noted that, as long as the user data is in turn stored in different storage units of different storage regions, any modifications made are encompassed within the scope of the present invention.

Figure 8:
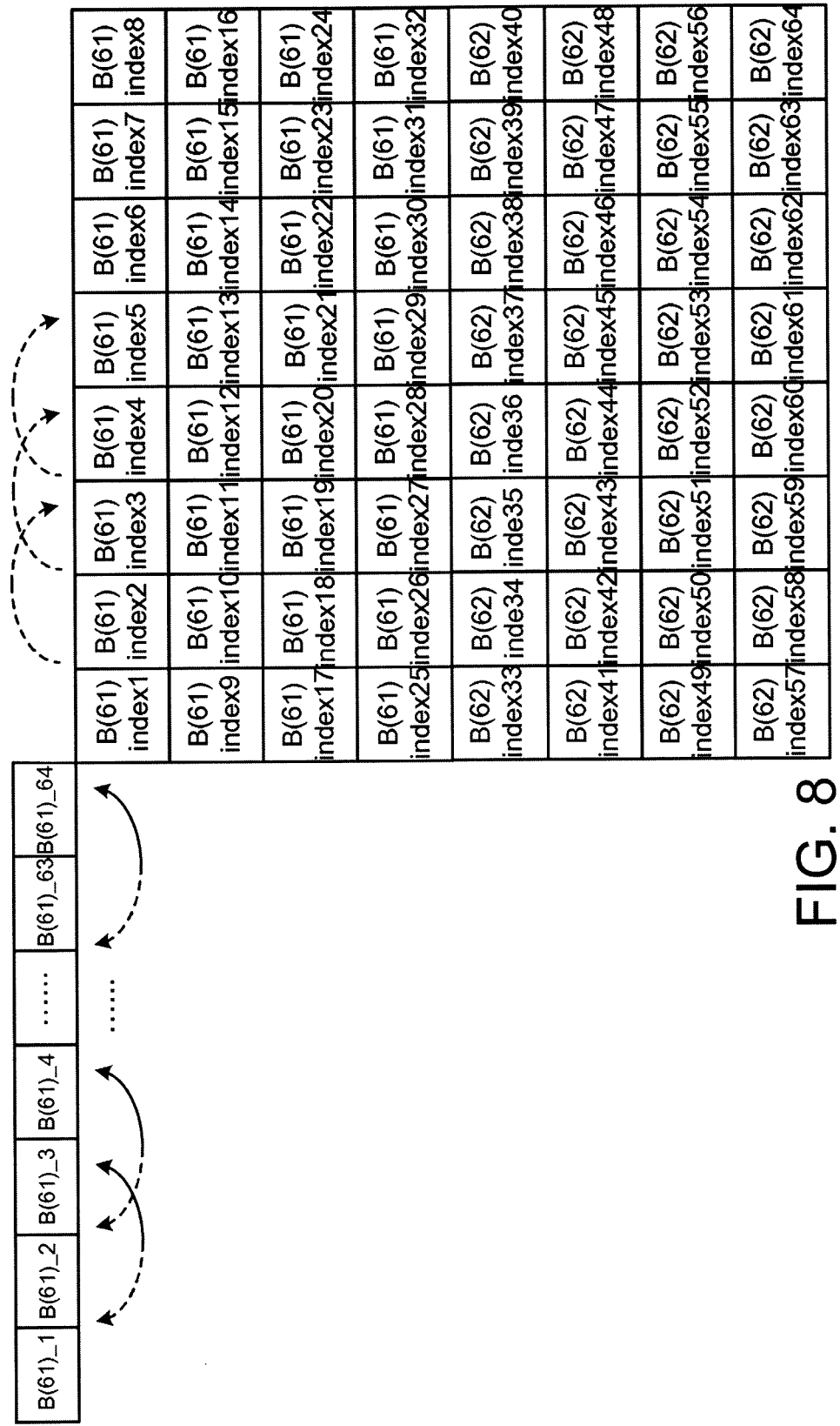
FIG. 8 is a schematic diagram of an internal being divided in a flash memory storage device according to another embodiment of the present invention.

FIG. 8 shows a schematic diagram of consecutively storing data in the first storage region Bank61 and the second storage region Bank62. A principle of FIG. 8 is similar to storing data in turn within the first storage region Bank61 and the second storage region Bank62; a first tag is introduced to point to a storage unit storing a newly update user data, and a next user data is stored according to a storage position of the newly updated user data. In this embodiment, the first storage region Bank61 and the second storage region Bank62 are divided into 64 storage units. First 64 bytes of a first storage unit B(61)Index1 are for storing a first tag and a second tag, with positions of the first 64 bytes respectively corresponding to the 64 storage units. When user data storing is desired, the user data is sequentially stored in the remaining 63 storage units. As shown in FIG. 8, supposing a first user data is stored in a storage unit B(61)Index2, a second user data is stored in a storage unit B(61)Index3, a third user data is stored in a storage unit B(61)Index4, and so forth—data storing is carried out according to such continuous storing principle. When the user data is again stored to a previously written storage unit, e.g., the user data is again stored to the storage unit B(61)Index3, it means that 63 times of data writing are already performed. To store the user data at this point, the entire 128 KB need to be erased and the user data is written according to the above principle. Therefore, a probability that a same storage unit is repeatedly written is significantly reduced to thereby prolong a lifespan of the flash memory storage device.

Figure 9:
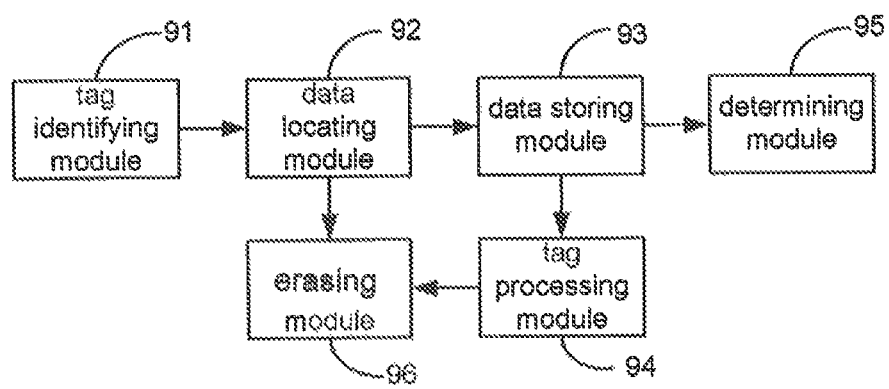
FIG. 9 is a schematic diagram of a data erasing apparatus in a flash memory storage device according to an embodiment of the present invention.

FIG. 9 shows a schematic diagram of a data erasing apparatus of a flash memory storage device according to an embodiment of the present invention. The flash memory storage device comprises a plurality of storage units.

A tag identifying module 91 first identifies a first tag. The first tag points to a storage unit storing a first data, and the first data is a newly updated data. A data locating module 92 locates the storage unit storing the first data according to the first tag. A data storing module 93 stores a second data to another storage unit. A tag processing module 94 renders the first tag to point to the another storage unit storing the second data.

In this embodiment, the tag processing module 94 renders the second tag pointing all remaining storage units apart from the storage unit storing the second data, and modifies a storage position of the first tag, such that the storage position of the first tag points to the another storage unit storing the second data.

A number of the storage units of the flash memory storage device is a first number, and each storage unit comprises a second number of bytes. In the first number of storage units, a first storage unit comprises the first number of bytes for respectively storing the first tag and the second tag. The second number is greater than the first number. Relative positions of the first number of bytes for storing the first tag and the second tag in the first storage unit respectively correspond to relative positions of the first number of storage units. Wherein, a byte of the storage unit storing the first data stores the first tag while all remaining bytes store other second tags, and a content of the byte corresponding to the first tag is different from a content of the bytes corresponding to the second tag.

The tag identifying module 91 further checks one after another from a first byte of the first storage unit, and confirms a relative position of the identified tag among the first number of consecutive bytes of the first storage unit upon identifying the byte storing the first tag. The data locating module 92 confirms that the relative position of the identified byte corresponding to the storage unit of the first number of storage units is the storage unit storing the first data.

Preferably, the first number is 32 and the second number is 2k. The flash memory storage device comprises at least two storage regions each comprising 32 storage units, and first 32 bytes of a first storage unit of each storage region are for storing the first tag and the second tag.

The data storing module 93 further stores the second data to a free storage unit in another storage region apart from the storage region storing the first data.

The tag processing module 94 further confirms a relative position of another storage unit storing the second data in another storage region, locates a byte of a first storage unit of another storage region corresponding to a relative position of the another storage unit storing the second data and stores the first tag to the located byte such that the first tag points to the another storage unit storing the second data, and changes the byte of the first storage unit of the storage region storing the first data to store the second tag from the first tag.

Referring to FIG. 9, when a determining module 95 determines that a free storage unit is unavailable in the another storage region, the data storing module 93 stores the second data to a free storage unit in another storage region of the flash memory storage device. The tag processing 94 confirms a relative position of another storage unit storing the second data in another storage region, locates a byte of a first storage unit of another storage region corresponding to a relative position of the another storage unit storing the second data and stores the first tag to the located byte such that the first tag points to the another storage unit storing the second data, and changes the byte of the first storage unit of the storage region storing the first data to store the second tag from the first tag. An erasing module 96 erases the another storage region after the data storing module 93 stores the second data.

When a third data needs to be stored after the erasing module 96 erases the another storage region, the data storing module 93 stores the third data to a free storage unit in another storage region. The tag processing module 94 confirms a relative position of the storage unit storing the third data, locates a byte of a first storage unit of another storage region corresponding to a relative position of the another storage unit storing the third data and stores the first tag to the located byte such that the first tag points to the another storage unit storing the third data, and changes the byte of the first storage unit of the storage region storing the second data to store the second tag from the first tag.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for storing data into a flash memory storage device, the flash memory storage device comprising a plurality of storage units, the method comprising:

identifying a first tag, the first tag pointing to a storage unit storing a first data and the first data being a newly updated data;

locating the storage unit storing the first data according to the first tag;

storing a second data to another storage unit;

pointing the first tag to the another storage unit storing the second data; and rendering a second tag pointing to all remaining storage units apart from the another storage storing the second data, wherein the step of pointing the first tag to the another storage unit storing the second data comprises:

modifying a storage position of the first tag such that the modified first tag points to the another storage unit storing the second data, and wherein:

a number of the storage units of the flash memory storage device is a first number, each storage unit comprises a second number of bytes, a first storage unit of the first number of storage units comprises the first number of bytes for respectively storing the first tag and the second tag, and the second number is greater than the first number;

in the first storage unit, relative positions of the first number of bytes for respectively storing the first tag and the second tag respectively correspond to relative positions of first number of storage units;

a byte of the storage unit storing the first data is for storing the first tag while all other remaining bytes are for storing another second tag, and a content of the byte corresponding to the first tag differs from a content of the bytes corresponding to the second tag; and the step of identifying the first tag and locating the storage unit storing the first data according to the first tag comprises:

checking one after another from a first byte of the first storage unit, and confirming a relative position of the identified tag among the first number of consecutive bytes of the first storage unit upon identifying the byte storing the first tag; and confirming the relative position of the identified byte corresponding to the storage unit of the first number of storage units is the storage unit storing the first data.

2. The method according to claim 1, wherein the first number is 32 and the second number is 2k, the flash memory storage device comprises a plurality of storage regions each comprising 32 storage units, and first 32 bytes of a first storage unit of each storage region are for storing the first tag and the second tag.

3. The method according to claim 1, wherein the first number is 64 and the second number is 2k, and first 64 bytes of the first storage unit of the plurality of storage units are for storing the first tag and the second tag.

4. The method according to claim 2, wherein:

the step of storing the second data to the another storage unit comprises storing the second data to the another storage unit in another storage region different from the storage region storing the first data;

the step of pointing the first tag to the another storage unit storing the second data comprises confirming a relative position of the another storage unit storing the second data in the another storage region, locating a byte of a first storage unit of another storage region corresponding to the relative position of the another unit storing the second data and storing the first tag to the located byte, such that the first tag points to the another storage unit storing the second data; and the step of rendering the second tag pointing to all the remaining storage units apart from the another storage storing the second data comprises changing the byte of the first storage unit of the storage region storing the first data to store the second tag from the first tag.

5. The method according to claim 4, further comprising:

before storing the second data to the another storage unit of the another storage region apart from the storage region storing the first data, determining whether a free storage unit in the another storage region apart from the storage region comprising the storage unit pointed to by the first tag is available;

when it is determined that the free storage unit in the another storage region is unavailable, storing the second data to a free storage unit of the another storage region;

confirming a relative position of the another storage unit in the another storage region storing the second data, locating a byte of a first storage unit of another storage region corresponding to a relative position of the another storage unit storing the second data and storing the first tag to the located byte, such that the first tag points to the another storage unit storing the second data;

changing the byte of the first storage unit of the storage region storing the first data to the second tag from the first tag; and erasing the another storage region after storing the second data.

6. The method according to claim 5, when a data storing for a third data is desired after erasing the another storage region, further comprising:

storing the third data to a free storage unit of the another storage region;

confirming a relative position of the storage unit storing the third data, locating a byte of a first storage unit of the another storage region corresponding to the relative position of the storage unit storing the third data, and storing the first tag to the located byte, such that the first tag points to the storage unit storing the third data; and changing the byte of the first storage unit of the storage region storing the second data to store the second tag from the first tag.

7. An apparatus for storing data into a flash memory storage device comprising a plurality of storage units, comprising:

a tag identifying module, for identifying a first tag, the first tag pointing to a storage unit storing a first data and the first data being a newly updated data;

a data locating module, for locating the storage unit storing the first data according to the first tag;

a data storage module, for storing a second data to another storage unit; and a tag processing module, for rendering the first tag pointing to the another storage unit storing the second data, wherein the tag processing module further renders a second tag pointing to all remaining storage units apart from the another storage unit storing the second data, wherein the tag processing module further modifies a storage position of the first tag, such that the storage position of the first tag points to the another storage unit storing the second data, and, wherein:

a number of the storage units of the flash memory storage device is a first number, each storage unit comprises a second number of bytes, a first storage unit in the first number of storage units comprises the first number of bytes for respectively storing the first tag and the second tag, and the second number is greater than the first number;

relative positions of the first number of bytes for storing the first tag and the second tag in the first storage unit respectively correspond to relative positions of the first number of storage units;

a byte of the storage unit storing the first data stores the first tag while all remaining bytes store other second tags, and a content of the byte corresponding to the first tag is different from a content of the bytes corresponding to the second tag; and the tag identifying module further checks one after another from a first byte of the first storage unit, and confirms a relative position of the identified tag among the first number of consecutive bytes of the first storage unit upon identifying the byte storing the first tag; the data locating module confirms that the relative position of the identified byte corresponding to the storage unit of the first number of storage units is the storage unit storing the first data.

8. The apparatus according to claim 7, wherein the first number is 32 and the second number is 2k, the flash memory storage device comprises a plurality of storage regions each comprising 32 storage units, and first 32 bytes of a first storage unit of each storage region are for storing the first tag and the second tag.

9. The apparatus according to claim 7, wherein the first number is 64 and the second number is 2k, and first 64 bytes of the first storage unit of the plurality of storage units are for storing the first tag and the second tag.

10. The apparatus according to claim 8, wherein:

the data storage module further stores the second data to another storage unit of another storage region different from the storage region storing the first data; and the tag processing module further confirms a relative position of the another storage unit storing the second data in the another storage region, locates a byte of a first storage unit of another storage region corresponding to a relative position of the another storage unit storing the second data and stores the first tag to the located byte, such that the first tag points to the another storage unit storing the second data, and changes the byte of the first storage unit of the storage region storing the first data to store the second tag from the first tag.

11. The apparatus according to claim 10, further comprising a determining module and an erasing module, wherein:

when the data storage module stores the second data to the another storage unit of the another storage region different from the storage region storing the first data, the determining module determines whether a free storage unit in the another storage region apart from the storage region comprising the storage unit pointed to by the first tag is available;

when the determining module determines that the free storage unit is unavailable in the another storage region, the data storing module stores the second data to a free storage unit in another storage region of the flash memory storage device; the tag processing module confirms a relative position of another storage unit storing the second data in another storage region, locates a byte of a first storage unit of another storage region corresponding to a relative position of the another storage unit storing the second data and stores the first tag to the located byte such that the first tag points to the another storage unit storing the second data, and changes the byte of the first storage unit of the storage region storing the first data to store the second tag from the first tag; and the erasing module erases the another storage region after the data storage module stores the second data.

12. The apparatus according to claim 11, wherein when a third data needs to be stored after the erasing module erases the another storage region, the data storing module stores the third data to a free storage unit in another storage region; the tag processing module confirms a relative position of the storage unit storing the third data, locates a byte of a first storage unit of another storage region corresponding to a relative position of the another storage unit storing the third data and stores the first tag to the located byte such that the first tag points to the another storage unit storing the third data, and changes the byte of the first storage unit of the storage region storing the second data to store the second tag from the first tag.

* * * * *